US012591640B2

(12) United States Patent
Watanabe

(10) Patent No.: US 12,591,640 B2
(45) Date of Patent: Mar. 31, 2026

(54) AI SYSTEM AND AI SYSTEM CONTROL METHOD UTILIZING STORAGE AND VECTOR DATABASE

(71) Applicant: HITACHI, Ltd., Tokyo (JP)

(72) Inventor: Satoru Watanabe, Santa Clara, CA (US)

(73) Assignee: HITACHI, LTD., Tokyo (JP)

( * ) Notice: Subject to any disclaimer, the term of this patent is extended or adjusted under 35 U.S.C. 154(b) by 42 days.

(21) Appl. No.: 18/666,036

(22) Filed: May 16, 2024

(65) Prior Publication Data

US 2025/0355976 A1 Nov. 20, 2025

(51) Int. Cl.
*G06F 21/10* (2013.01)
*G06F 16/2455* (2019.01)

(52) U.S. Cl.
CPC ........ *G06F 21/106* (2023.08); *G06F 16/2455* (2019.01)

(58) Field of Classification Search
CPC ............................ G06F 21/106; G06F 16/2455
See application file for complete search history.

(56) References Cited

U.S. PATENT DOCUMENTS

| | | | |
|---|---|---|---|
| 5,619,709 A | 4/1997 | Caid et al. | |
| 8,782,047 B2 | 7/2014 | Pinkney et al. | |
| 11,321,312 B2 | 5/2022 | Zou et al. | |
| 12,086,190 B2 * | 9/2024 | Aikoh ................. | G06F 16/2264 |

| | | | |
|---|---|---|---|
| 2019/0230036 A1 * | 7/2019 | Thanasekaran ....... | G06F 3/0646 |
| 2023/0106019 A1 * | 4/2023 | Jezewski ............. | G06F 16/2291 |
| | | | 707/736 |
| 2023/0237060 A1 * | 7/2023 | Patton ............... | G06F 16/24575 |
| 2025/0111075 A1 * | 4/2025 | Krishna ............. | G06F 21/6227 |

OTHER PUBLICATIONS

Lewis, Patrick, et al. "Retrieval-augmented generation for knowledge-intensive nlp tasks." Advances in Neural Information Processing Systems 33 (2020): 9459-9474, 16 pages.
Han, Yikun; Chunjiang Liu; and Pengfei Wang. "A comprehensive survey on vector database: Storage and retrieval technique, challenge." arXiv preprint arXiv:2310.11703 (2023), 13 pages.

* cited by examiner

*Primary Examiner* — SM A Rahman
(74) *Attorney, Agent, or Firm* — PROCOPIO, CORY, HARGREAVES & SAVITCH LLP

(57) ABSTRACT

Systems and methods described herein involve improving the accuracy of artificial intelligence (AI) by providing an AI engine with related data in response to a query, including a main site comprising one or more servers that manage an AI augmented engine configured to provide the AI engine with related data in response to the query, the AI engine configured to provide output in response to input queries and the related data; a storage system that manages data according to data regulation rules; and one or more remote sites, each comprising another storage system that manages data according to data regulation rules configured to restrict copying of the managed data according to location restriction and user privilege; wherein the AI augmented engine is configured to, in response to the query, copy query related data from the one or more remote sites to the storage system of the main site, when permitted by the data regulation rules of the one or more remote sites.

8 Claims, 16 Drawing Sheets

201 202

| Query Num | Query |
|---|---|
| 1 | What are the five main drivers of global warming? |
| 2 | List the costs and benefits of measures to control carbon dioxide emissions |
| 3 | Tell me the impact of ocean pollution on global warming |
| ⋮ | ⋮ |

| bucket | Object key | Vector |
|---|---|---|
| us-east | docs/competitors.txt | -1.23, 2.23, 0.13, ..., 12.8 |
| us-east | docs/businessStatus.txt | 1.22, 4.33, -0.12, ..., 5.67 |
| us-west | docs/emmision.txt | 7.43, 2.11, -1.11, ..., 3.23 |
| eu-north | docs/productSample.txt | 0.12, 2.22, 6.88, ..., -9.89 |
| ⋮ | ⋮ | ⋮ |

FIG. 3

| bucket | Storage address | Storage location |
|---|---|---|
| us-east | 127.0.0.1 (local) | USA |
| us-west | 10.232.5.79 | USA |
| eu-north | 10.232.19.8 | EU |
| ⋮ | ⋮ | ⋮ |

FIG. 4

| bucket | Object key | Data address |
|---|---|---|
| us-east | docs/competitors.txt | 0-100 |
| us-east | docs/businessStatus.txt | 101-120 |
| us-east | docs/emmision.txt | 130-234 |
| ⋮ | ⋮ | ⋮ |

FIG. 5

| bucket | Object key | Accessible privilege | Accessible location |
|---|---|---|---|
| us-east | docs/competitors.txt | Division A, Division B | USA |
| us-east | docs/businessStatus.txt | Division A | USA, EU |
| us-east | docs/emmision.txt | Division C | USA, EU |
| ⋮ | ⋮ | ⋮ | ⋮ |

| Query | Privilege |
|-------|-----------|
| Effective industrial response to global warming | Division A |

| bucket | Object key |
|--------|-----------|
| us-east | docs/industryAnalysis.txt |
| eu-east | docs/businessAnalysisEU.txt |
| us-west | docs/EVmarket.txt |
| eu-north | docs/GasProductionEU.txt |
| us-east | docs/supplyChain.txt |

| bucket | Object key | Copy result |
|--------|-----------|-------------|
| us-east | docs/industryAnalysis.txt | Success |
| eu-east | docs/businessAnalysisEU.txt | Location violation |
| us-west | docs/EVmarket.txt | Privilege violation |
| eu-north | docs/GasProductionEU.txt | Location violation |
| us-east | docs/supplyChain.txt | Success |

FIG. 12

● Query vector

○ Document vector
(available)

✕ Document vector
(unavailable due to
lack of user privilege)

FIG. 15

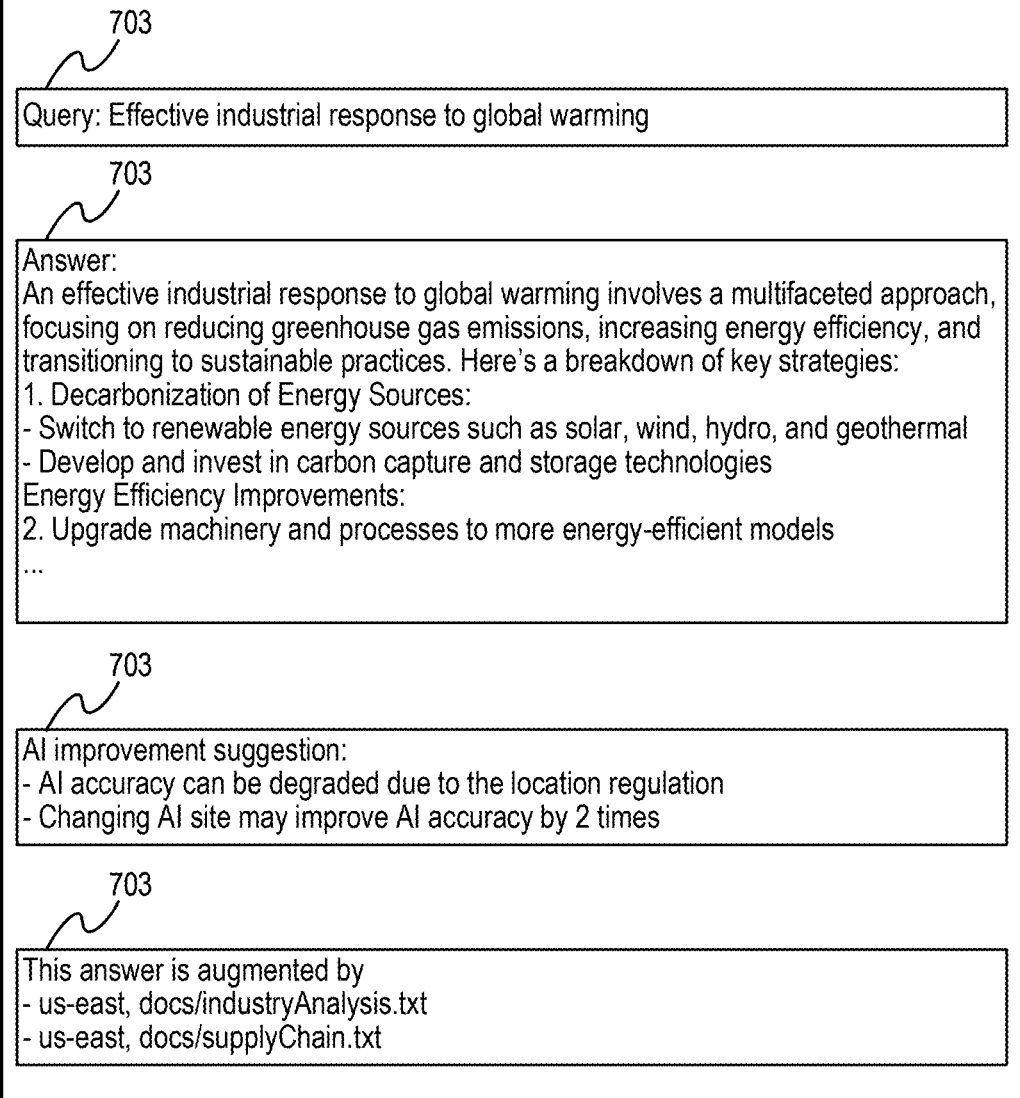

703

Query: Effective industrial response to global warming

703

Answer:
An effective industrial response to global warming involves a multifaceted approach, focusing on reducing greenhouse gas emissions, increasing energy efficiency, and transitioning to sustainable practices. Here's a breakdown of key strategies:
1. Decarbonization of Energy Sources:
- Switch to renewable energy sources such as solar, wind, hydro, and geothermal
- Develop and invest in carbon capture and storage technologies
Energy Efficiency Improvements:
2. Upgrade machinery and processes to more energy-efficient models
...

703

AI improvement suggestion:
- AI accuracy can be degraded due to the location regulation
- Changing AI site may improve AI accuracy by 2 times

703

This answer is augmented by
- us-east, docs/industryAnalysis.txt
- us-east, docs/supplyChain.txt

FIG. 17

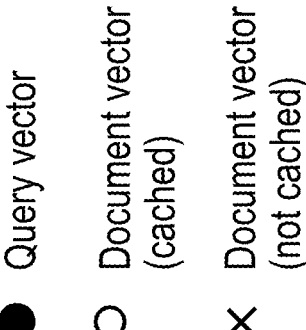
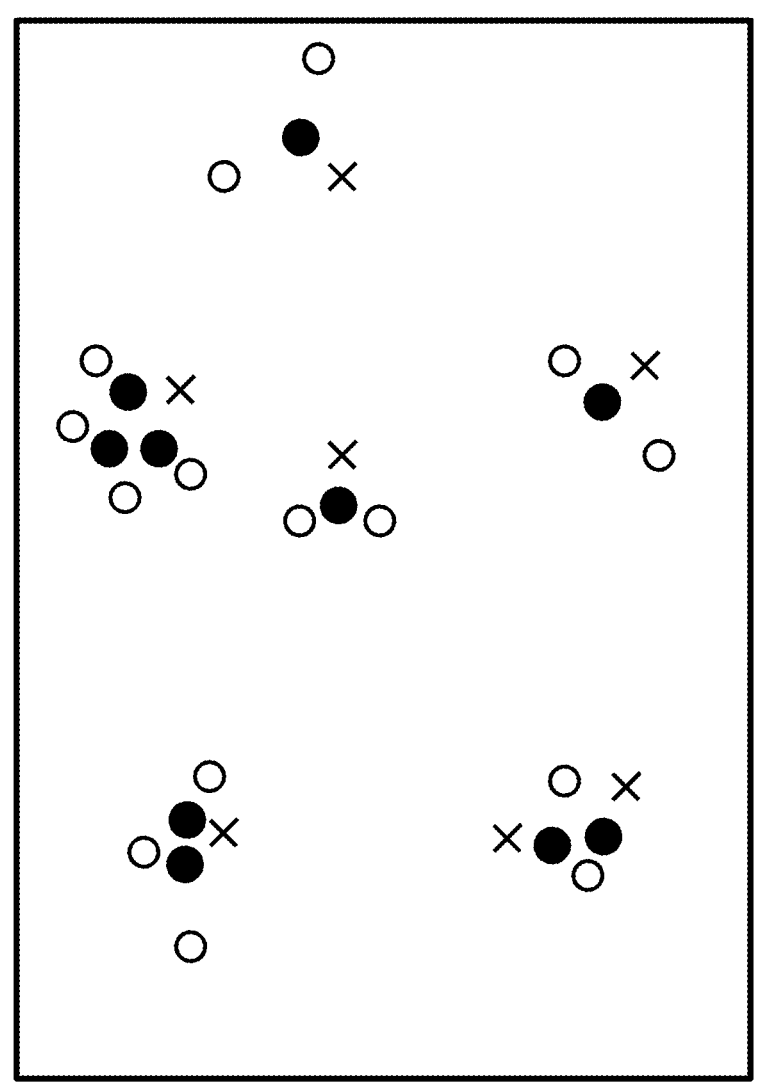
FIG. 18

AI SYSTEM AND AI SYSTEM CONTROL METHOD UTILIZING STORAGE AND VECTOR DATABASE

BACKGROUND

Field

The present disclosure is generally directed to storage systems, and more specifically, to Artificial Intelligence (AI) control systems for storage systems using vector database.

Related Art

Generative artificial intelligence (genAI) produces new texts, images, and videos corresponding to queries, which is utilized for improving the business efficiency such as financial consulting, program coding, and computer system operation. The higher accuracy of the genAI is beneficial for improving the business efficiency.

The genAI produces new contents based on the training data. Thus, the accuracy of the genAI depends on the training data. However, the training data are not necessarily adequate, especially for applying the genAI to specialized tasks. For improving the accuracy in specialized tasks, training data for the specialized task are required.

For providing the genAI with the specialized training data, retrieval augmented generation (RAG) prevails, which provides the genAI with the training data corresponding to the query. The training data specific to the query are searched from external data sources in the RAG. They are input to the genAI before the query. By inputting the specialized training data to the query, the accuracy of the genAI can be improved.

For searching the training data specific to the query, a vector database is employed in the related art, which stores high-dimensional vector index of data. The vector represents the context of the data. In this way, vector database can find the conceptually related data efficiently.

For utilizing vector database in RAG, the query is vectorized. The related art vector database implementation searches the related data by comparing the vector of the query and those of data. The related data are input to the genAI for improving the accuracy.

In the related art, there is a system and method for generating context vectors. In the proposal, context vectors represent conceptual relationships among information items by quantitative means. The vector database can quantify the conceptual relationship between the information items.

In the related art, there is an information sharing platform (ISP), which enables uses to access geographically distributed data by replicating the data. The access can be restricted by the user privileges and data location regulations. The ISP enables us to share the information items without violating information regulations.

SUMMARY

The RAG searches the conceptually close data to the query and inputs the data to AI engines. However, the data can be stored in geographically distributed sites. The distribution causes difficulties in developing an efficient AI system. Specifically, there are three problems to be solved in the related art; (1) gather the conceptually close data from the distributed sites for the RAG, (2) utilize the conceptually close data immediately after receiving the query in the RAG, (3) provide users with suggestions to improve the AI accuracy in the RAG.

For solving the aforementioned problems, example implementations described herein involve a query related data copy function that copy the conceptually close data distributed in multiple sites. The example implementations described herein includes a query related data cache function that caches the related data to the main site utilizing query history that recodes the queries received from users. Further, the example implementations involve an AI improvement suggest function that develop suggestions based on the data used and unused in the RAG due to the data management regulations.

Aspects of the present disclosure can include a system for improving the accuracy of artificial intelligence (AI) by providing an AI engine with related data in response to a query, involving a main site including one or more servers that manage an AI augmented engine configured to provide the AI engine with related data in response to the query, the AI engine configured to provide output in response to input queries and the related data; and a storage system that manages first data according to first data regulation rules; and one or more remote sites, each comprising another storage system that manages second data according to second data regulation rules configured to restrict copying of the managed second data according to location restriction and user privilege; wherein the AI augmented engine is configured to, in response to the query, copy query related data from the one or more remote sites to the storage system of the main site, when permitted by the second data regulation rules of the one or more remote sites.

Aspects of the present disclosure can include a method for improving the accuracy of artificial intelligence (AI) by providing an AI engine with related data in response to a query, including, for a main site, managing, at one or more servers, an AI augmented engine configured to provide the AI engine with related data in response to the query, the AI engine configured to provide output in response to input queries and the related data; and managing first data according to first data regulation rules at a storage system; and for one or more remote sites, each comprising another storage system, managing second data according to second data regulation rules configured to restrict copying of the managed second data according to location restriction and user privilege; and in response to the query, copying query related data from the one or more remote sites to the storage system of the main site, when permitted by the second data regulation rules of the one or more remote sites.

BRIEF DESCRIPTION OF DRAWINGS

A general architecture that implements the various features of the disclosure will now be described with reference to the drawings. The drawings and the associated descriptions are provided to illustrate example implementations of the disclosure and not to limit the scope of the disclosure. Throughout the drawings, reference numbers are reused to indicate correspondence between referenced elements.

FIG. 2 illustrates an example of query history, in accordance with an example implementation.

FIG. 3 illustrates an example of vectorized data index, in accordance with an example implementation.

FIG. 4 illustrates an example of storage address table, in accordance with an example implementation.

FIG. 5 illustrates an example of data index, in accordance with an example implementation.

FIG. 6 illustrates an example of data regulation table, in accordance with an example implementation.

FIG. 8 illustrates an example of the query that the query augment function receives from users, in accordance with an example implementation.

FIG. 10 illustrates an example of result of the data search function that sent to the query augment function, in accordance with an example implementation.

FIG. 12 illustrates an example of the result sent from the query related data copy function to the query augment function, in accordance with an example implementation.

FIG. 15 illustrates a schematic diagram of the suggestion method of the AI improvement suggest function, in accordance with an example implementation.

FIG. 17 illustrates an example of output of the query augment function, in accordance with an example implementation.

FIG. 18 illustrates a schematic diagram of caching method of the query related data cache function, in accordance with an example implementation.

DETAILED DESCRIPTION

Figure 1:
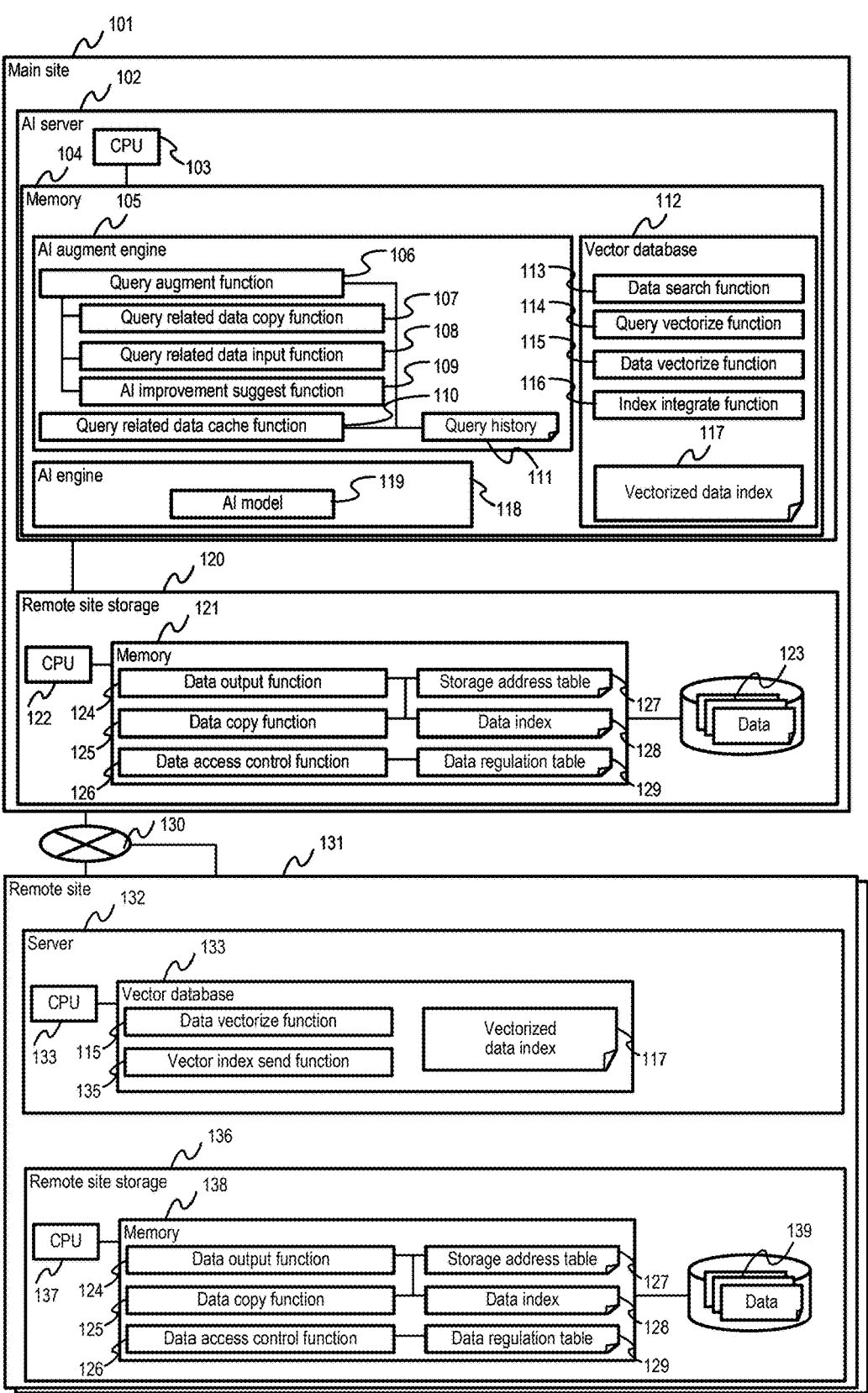
FIG. 1 illustrates the block diagram of the system, in accordance with an example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of the ordinary skills in the art practicing implementations of the present application. Selection can be conducted by a user through a user interface or other input means, or can be implemented through a desired algorithm. Example implementations as described herein can be utilized either singularly or in combination, and the functionality of the example implementations can be implemented in any manner in accordance with the desired implementation.

FIG. 1 illustrates the block diagram of the system, in accordance with an example implementation. It includes a main site 101 and remote sites 131. The main site 101 has an AI server 102 and a main site storage 120. AI server 102 can include a Central Processing Unit (CPU) 103 and Memory 104. Memory 104 includes an AI augment engine 105, an AI engine 118, and a vector database 112, which operate on the AI server 102. The main site storage 120 stores data for providing data with the AI server 102.

In the example implementations described herein, the AI augment engine 105 can include a query augment function 106, a query related data copy function 107, a query related data input function 108, an AI improvement suggest function 109, a query related data cache function 110, and a query history 111. The vector database 112 can include a data search function 113, a query vectorize function 114, a data vectorize function 115, an index integrate function 116, and a vectorized data index 117.

Main site storage 120 can also include its own CPU 122 and memory 121. The memory 121 of the main site storage 120 can include a data output function 124, a data copy function 125, a data access control function 126, a storage address table 127, a data index 128 and a data regulation table 129. Main site storage 120 also manages storage devices that manage data 123.

Main site 101 can be networked to remote site 131 via a network 130. The remote site 131 includes a server 132 and a remote site storage 136. A vector database 133 works on the server 132. Remote site server 132 also includes its own CPU 137. Vector database 133 can include data vectorize function 115, vector index send function 135 and vectorized data index 117.

The remote site storage 136 stores geographically distributed data, meaning that the data in the main site and the remote sites are not the same. The remote site storage 136 can involve CPU 137 and memory 138. Memory 138 can include the same functions as that of the main site storage memory 121. Remote site storage 136 may also have its own storage devices to manage data 139.

As will be described herein, the system of FIG. 1 is a system for improving the accuracy of artificial intelligence (AI) by providing an AI engine with related data in response to a query, which can include a main site 101 including one or more servers 102 that manage an AI augmented engine 105 configured to provide the AI engine 118 with related data in response to the query, the AI engine configured to provide output in response to input queries and the related data; and a storage system 120 that manages first data 123 according to first data regulation rules 129; and one or more remote sites 131, each involving another storage system 136 that manages second data 139 according to second data regulation rules 129 configured to restrict copying of the managed second data according to location restriction and user privilege; wherein the AI augmented engine 105 is configured to, in response to the query, copy query related data (e.g., via query related data copy function 107) from the one or more remote sites 131 to the storage system 120 of the main site, when permitted by the second data regulation rules 129 of the one or more remote sites.

Such a system can further involve a vector database 112 utilized by the one or more servers 102 to facilitate search of the related data for the query; wherein the AI augmented engine 105 is configured to find the query related data from the vector database 112 according to conceptual similarity to the query.

In such a system, the AI augmented engine 105 can be configured to provide suggestions directed to AI improvement (e.g., via AI improvement suggest function) based on used and unused data due to the first data regulation rules 129 or the second data regulation rules 129.

In such a system, the AI augmented engine 105 can manage a query history 111 to record queries received from users and is configured to copy the query related data into a cache memory 104, 110 of the main site 101 based on analysis of the query history.

FIG. 2 illustrates an example of query history 111, in accordance with an example implementation. It records the queries that the AI augment engine 105 received from the users. The query history 111 can include fields for the query index number 201 and the query 202.

FIG. 3 illustrates an example of vectorized data index 117, in accordance with an example implementation. It includes bucket 301, object key 302, and vector 303. The bucket 301 indicates the container of the objects, where object is the set of data and metadata. The object key 302 is the identifier of the object. The vector 303 is the conceptual representation of the object.

Data vectorize function 115 periodically updates the vectorized data index 117 regarding the data stored the local site. The vector index send function 135 periodically sends the vector data index 117 to the index integrate function 116. The index integrate function 116 integrates the vectorized data indexes 117 in the remote sites to that in the main site. Thus, the vectorized data index 117 in the main site includes all the entries of data stored in both the main and remote sites.

FIG. 4 illustrates an example of storage address table 127, in accordance with an example implementation. It includes bucket 401, storage address 402, and storage location 403. The storage address 402 indicates the storage address of the storage that stores the bucket 401, where "127.0.0.1 (local)" means that the bucket is stored in the local storage. The storage location indicates the storage location of the storage that stores the bucket 401.

FIG. 5 illustrates an example of data index 128, in accordance with an example implementation. It includes bucket 501, object key 502, and data address 503. The data address 503 enables the storage to output the data specified by the bucket 501 and the object key 502.

FIG. 6 illustrates an example of data regulation table 129, in accordance with an example implementation. It includes bucket 601, object key 602, accessible privilege 603, and accessible location 604. The accessible privilege 603 indicates the user privilege required to access the data. The accessible location 604 indicates the locations that the data can be copied. For example, "USA, EU" in the accessible location 604 means that the data can be copied to USA and EU.

Figure 7:
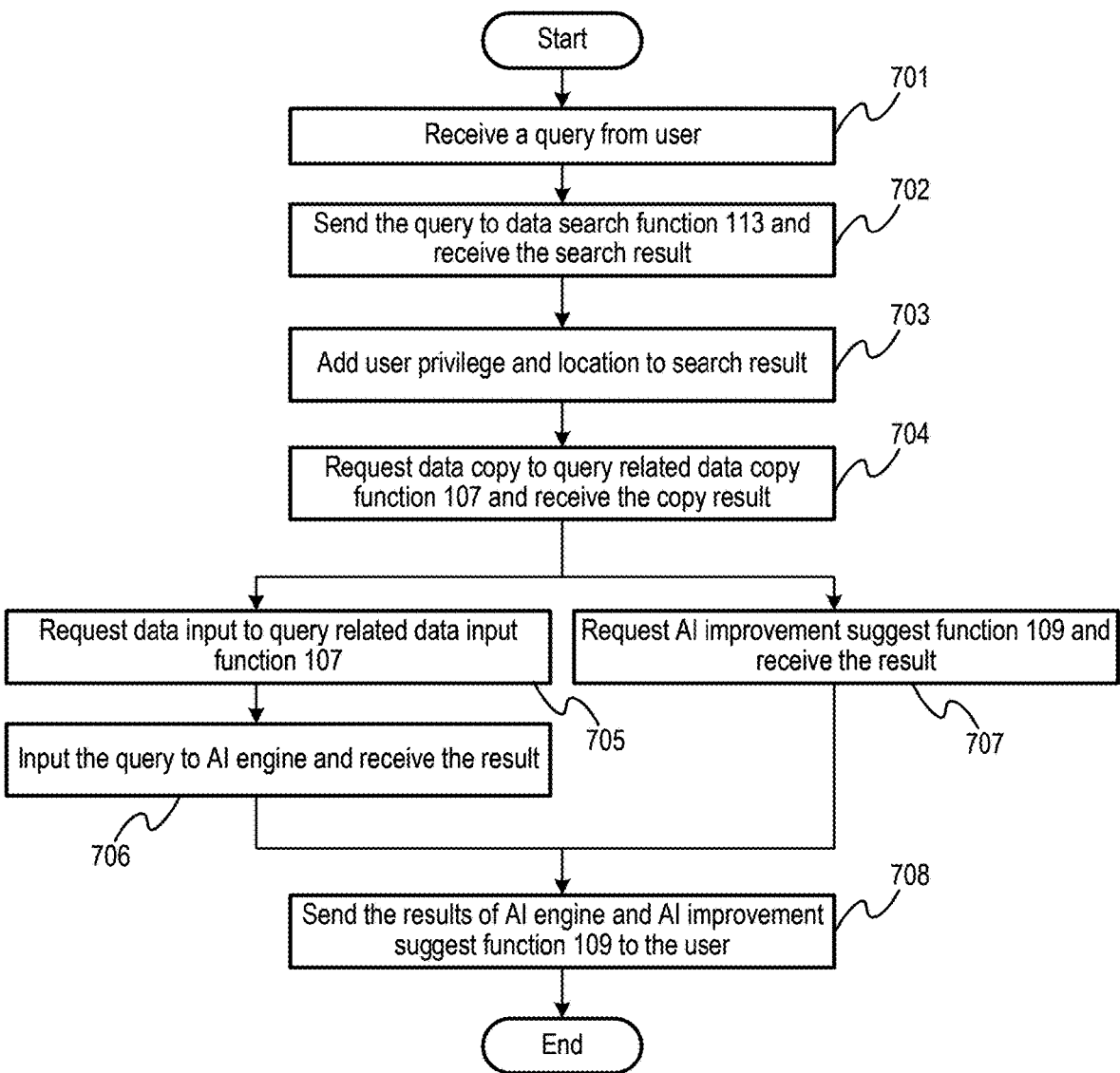
FIG. 7 illustrates an example of flowchart of the query augment function, in accordance with an example implementation.

FIG. 7 illustrates an example of flowchart of the query augment function 106, in accordance with an example implementation. The processing 701 receives a query from users. The processing 702 sends the query to the data search function 113 and receives the search result. The processing 703 add the user privilege and location to the search result, where the user privilege is specified in the query and the location is the site location of the main site. The processing 704 requests data copy to the query related data copy function 107 and receives the copy result. The processing 705 requests data input to the query related data input function 107. The processing 706 input the query to AI engine and receives the result. The processing 707 requests AI improvement suggest function 109 and receives the results. The processing 708 sends the results of the AI engine and AI improvement suggest function 109 to the user.

FIG. 8 illustrates an example of the query that the query augment function 106 receives from users, in accordance with an example implementation. It includes the query 801 and the privilege 802 that the user possesses.

Figure 9:
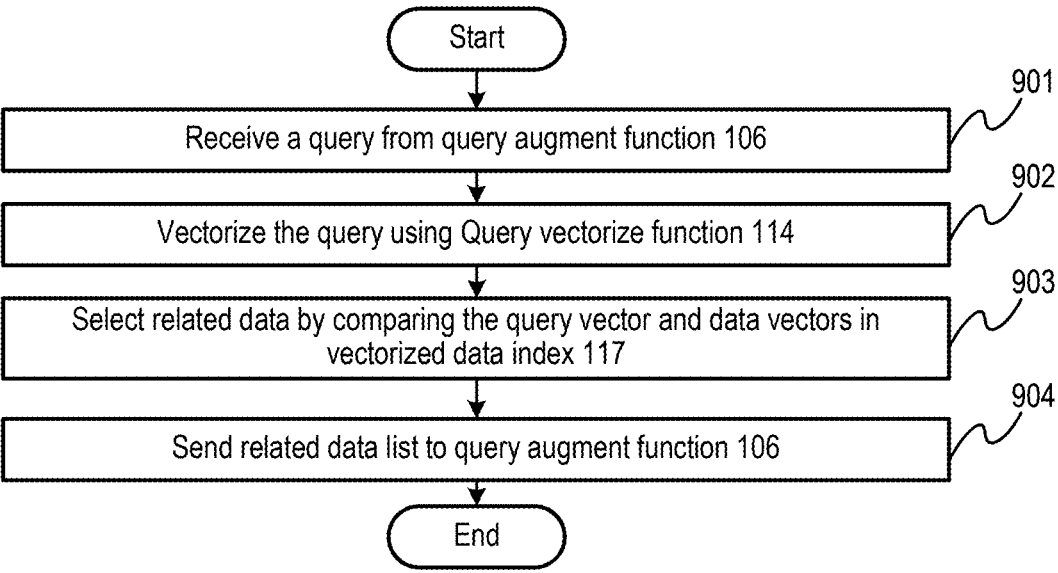
FIG. 9 illustrates an example of flowchart of the data search function, in accordance with an example implementation.

FIG. 9 illustrates an example of flowchart of the data search function 113, in accordance with an example implementation. The processing 901 receives a query from the query augment function 106. The processing 902 vectorizes the query using the query vectorize function 114. In the related art, there are many methods to vectorize the query. The query vectorize function 114 employs one of the vectorizing methods as known in the related art to facilitate the desired implementation. The processing 903 select the related data to the query by comparing the query vector and data vectors in the vectorized data index 117. The processing 904 sends the related data list to the query augment function 106.

FIG. 10 illustrates an example of result of the data search function 113 that sent to the query augment function 106, in accordance with an example implementation. It includes bucket 1001 and object key 1002. The bucket 1001 and object key 1002 enables the data augment function 106 to identify the related data to the query.

Figure 11:
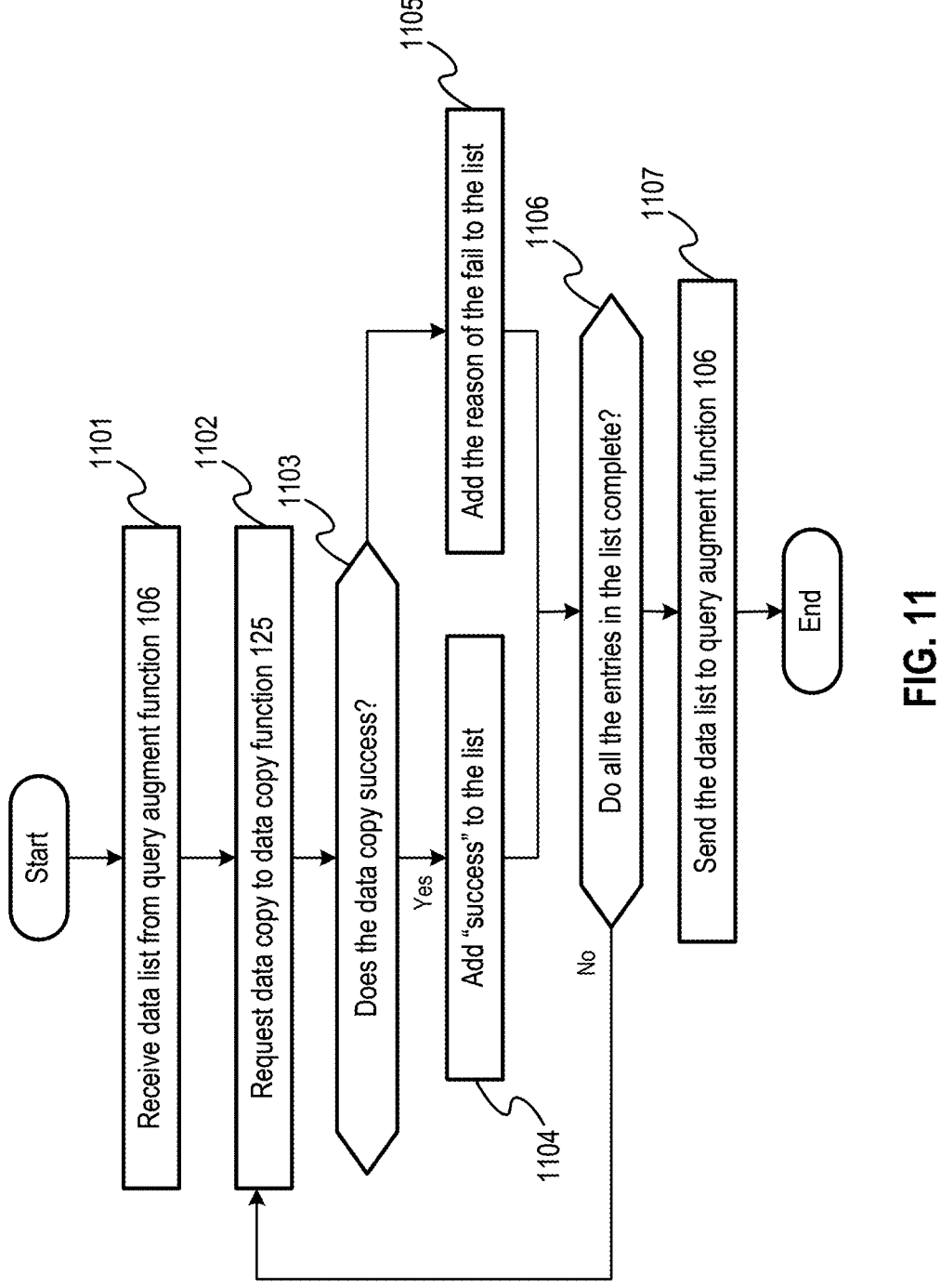
FIG. 11 illustrates an example of flowchart of the query related data copy function, in accordance with an example implementation.

FIG. 11 illustrates an example of flowchart of the query related data copy function 107, in accordance with an example implementation. The processing 1101 receives the data list from the query augment function 106. The processing 1102 requests data copy to the data copy function 125. The judgement 1103 judges whether the data copy was success or not. If the data copy was successful (Yes), the processing 1104 adds "success" to the list. If the data copy was failed (No), the processing 1105 adds the reason of the fail to the list. The judgement 1106 judges whether the all the entries in the list were completed. If there are remaining entries (No), it goes back to the processing 1102. If all the entries were completed (Yes), the processing 1107 sends the data list to the query augment function 106.

FIG. 12 illustrates an example of the result sent from the query related data copy function 113 to the query augment function 106, in accordance with an example implementation. It includes buckets 1201, object key 1202, and copy result 1203.

Figure 13:
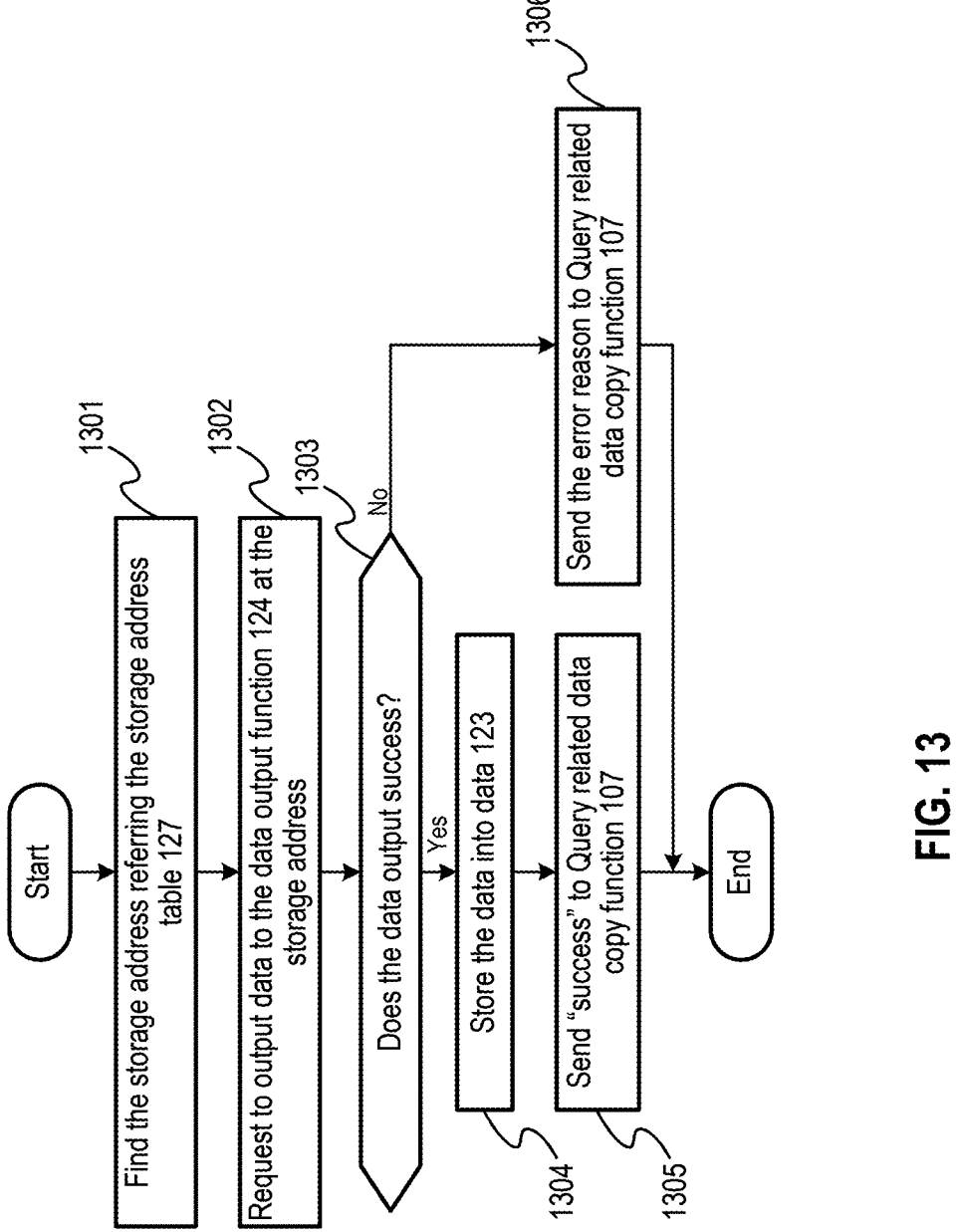
FIG. 13 illustrates an example of flowchart of the data copy function, in accordance with an example implementation.

FIG. 13 illustrates an example of flowchart of the data copy function 125, in accordance with an example implementation. The processing 1301 find the storage address by referring the storage address table 127. The processing 1302 requests to output data to the data output function 124 at the storage address. The judgement 1303 judges whether the data output was successful or not. If it was successful (Yes), the processing 1304 store the data into the data 123 in the main site, and the processing 1305 sends "success" to the query related data copy function 107. If it was failed (No), the processing 1306 sends the error reason to the query related data copy function 107, where the reason can be privilege and location violations.

Figure 14:
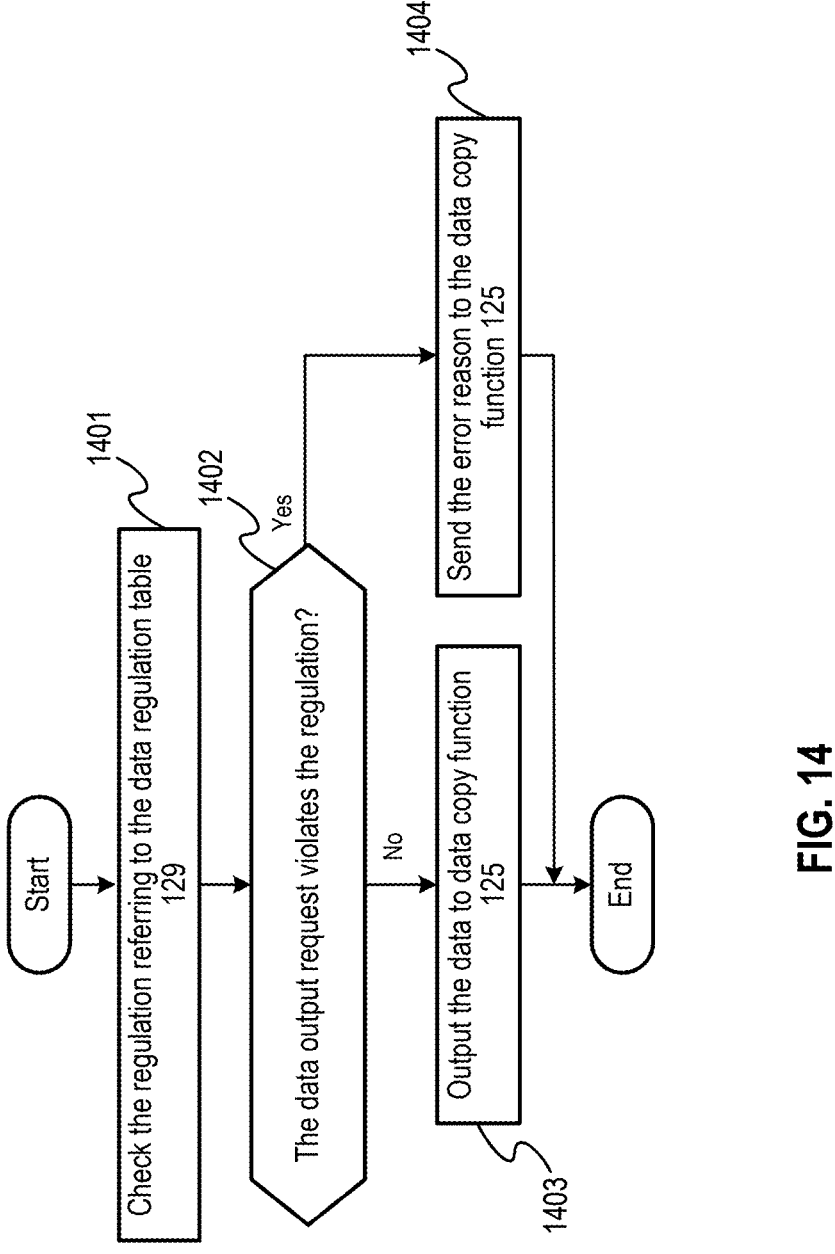
FIG. 14 illustrates an example of flowchart of the data output function, in accordance with an example implementation.

FIG. 14 illustrates an example of flowchart of the data output function 124, in accordance with an example implementation. The processing 1401 checks the regulation by referring to the data regulation table 129. The judgement 1402 judges whether the data output request violates the regulation or not. If the request does not violate the regulation, the processing 1403 outputs the data to the data copy function 125. If the request violates the regulation, the processing 1404 sends the error reason such as privilege and location violations to the data copy function 125.

Figure 15:
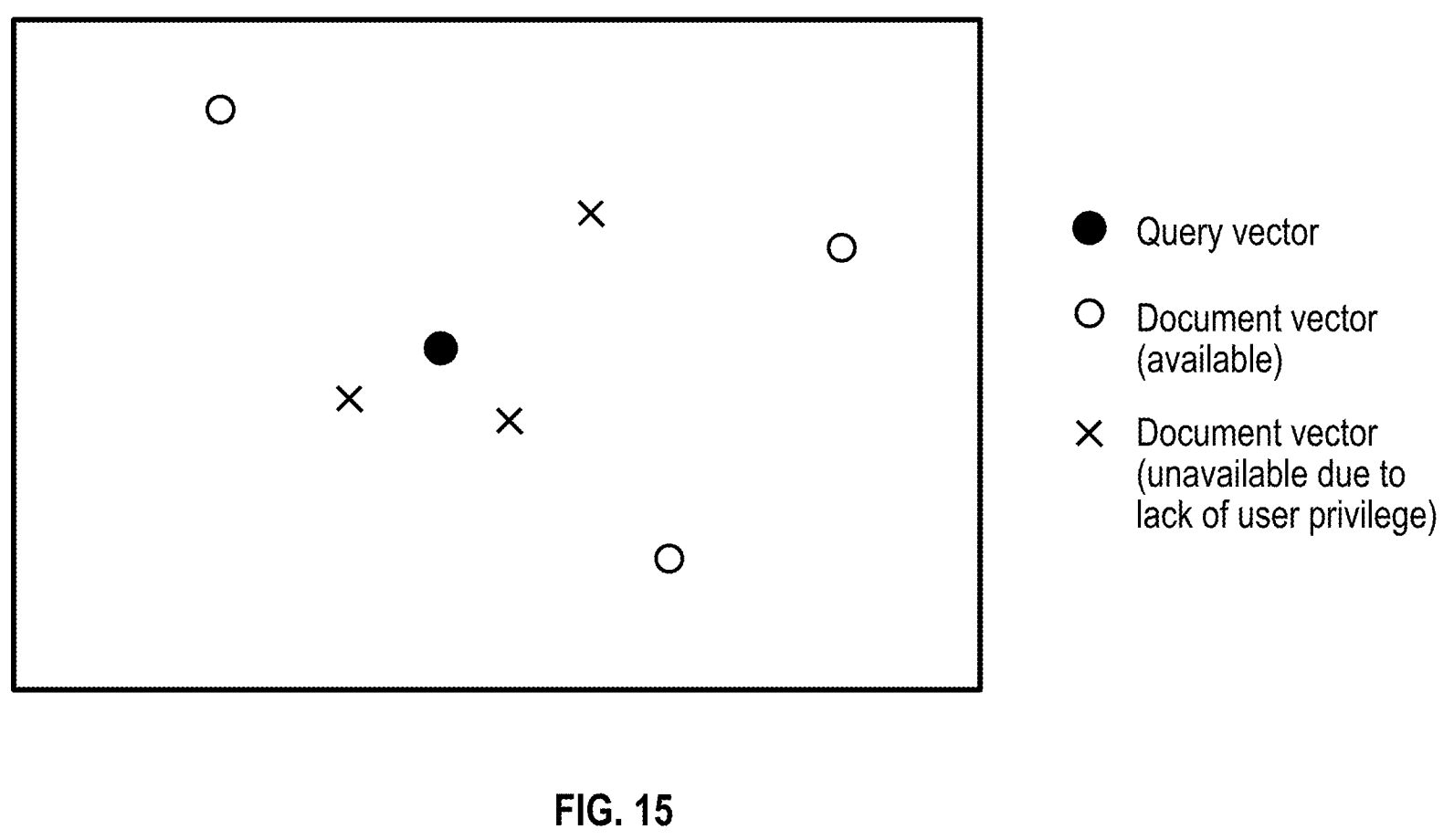

FIG. 15 illustrates a schematic diagram of the suggestion method of the AI improvement suggest function 109, in accordance with an example implementation. In FIG. 15, the black point, cross mark, and white circle indicate the query vector, document vector that is unavailable due to the lack of the user privilege, and available document vector, respectively. There are three document vectors that are unavailable due to the lack of user privilege. Thus, the change of user privilege can increase the number of documents that can be used in the RAG and improves the AI accuracy. The AI improvement suggest function 109 can develop advanced suggestions by corroborating the vector database 112. However, this figure illustrates an example of suggestions, and the present disclosure is not limited thereto.

Figure 16:
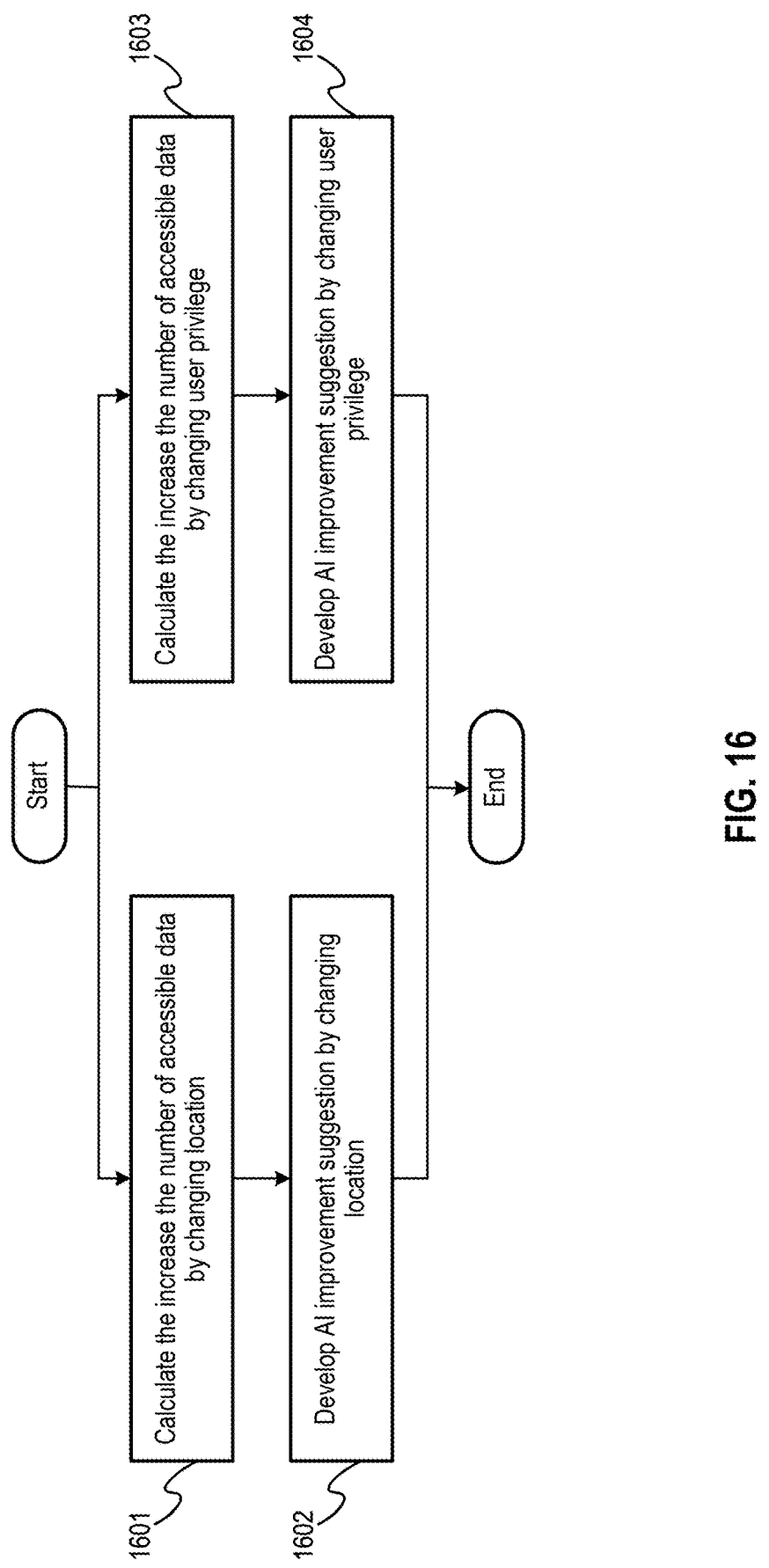
FIG. 16 illustrates an example of flowchart of the AI improvement suggest function, in accordance with an example implementation.

FIG. 16 illustrates an example of flowchart of the AI improvement suggest function 109, in accordance with an example implementation. The processing 1601 calculates the increase the number of accessible data by changing location. The processing 1602 develops AI improvement suggestions by changing location. For example, in FIG. 12, two out of five data violate the location regulation. Thus, the AI improvement suggest function 109 can develop a suggestion of "AI accuracy can be degraded due to the location regulation." Further, the AI improvement suggest function 109 can develop a suggestion of "changing AI site may improve AI accuracy by two times," because the location change can double the number of available documents from 2 to 4.

The processing 1603 calculates the increase the number of accessible data by changing user privilege. The processing 1604 develops AI improvement suggestion by changing user privilege.

FIG. 17 illustrates an example of output of the query augment function 106, in accordance with an example implementation. The output 1701 describes the query from the user. The output 1702 is the output generated by the AI engine 118 based on the AI model 119. The output 1703 is the output generated by the AI improvement suggest function 109. The output 1704 is the list the documents utilized for the RAG.

FIG. 18 illustrates a schematic diagram of caching method of the query related data cache function 110, in accordance with an example implementation. In the diagram, black point, white circle, and cross mark indicate query vector, cached document vector, and not cached document vector, respectively. The query related data cache function 110 caches the data (copies the data to the main site storage) to eliminate the copy delay for improving the response time.

The query related data cache function 110 analyzes the distribution of the query vectors and cache the documents located near the query vectors. Because the AI augment engine 105 will receive the similar queries to those in the query history, the caching is beneficial to improve the accuracy and response time of the AI. The query related data cache function 110 can be implemented in many algorithms, but this implementation describes an example of algorithms.

Figure 19:
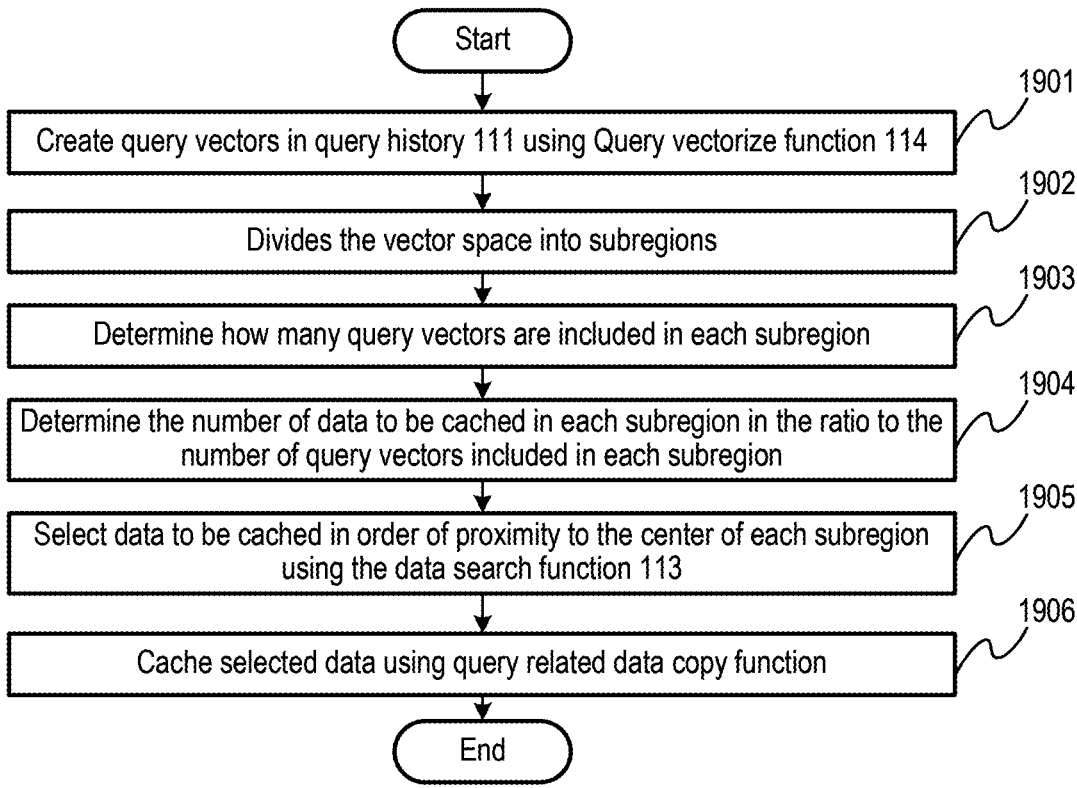
FIG. 19 is an example of a flowchart of query related data cache function, in accordance with an example implementation.

FIG. 19 illustrates an example of flowchart of the query related data cache function 110, in accordance with an example implementation. The query related data cache function 110 starts working periodically. The processing 1901 creates query vectors in the query history 111 using the query vectorize function 114. The processing 1902 divides the vector space into subregions. The processing 1903 determine how many query vectors included in each subregion. The processing 1904 determines the number of data to be cached in each subregion in the ratio to the number of the query vectored included in each subregion. This means that the more query vectors in a subregion, the more document vectors to be cached to the subregion. The processing 1905 selects data to be cached in order of proximity to the center of each subregion using the data search function 113. The processing 1906 caches the selected data using the query related data copy function 107.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer readable storage medium or a computer readable signal medium. A computer readable storage medium may involve tangible mediums such as, but not limited to, optical disks, magnetic disks, read-only memories, random access memories, solid-state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software.

Moreover, the various functions described can be performed in a single unit, or can be spread across a number of components in any number of ways. When performed by software, the methods may be executed by a processor, such as a general-purpose computer, based on instructions stored on a computer readable medium. If desired, the instructions can be stored in the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A system for improving the accuracy of artificial intelligence (AI) by providing an AI engine with related data in response to a query, comprising:

a main site comprising:

one or more servers that manage an AI augmented engine configured to provide the AI engine with related data in response to the query, the AI engine configured to provide output in response to input queries and the related data;

a storage system that manages first data according to first data regulation rules; and a vector database that stores a vectorized data index comprising vectorized representations of data stored across the main site and one or more remote sites, wherein the vector database is configured to identify query related data by vectorizing the query into a query vector and comparing the query vector with the vectorized representations using a vector similarity metric to identify data having conceptual similarity to the query based on vector proximity, and wherein the vector database includes an index integrate function that receives vectorized data indexes from vector databases at each of the one or more remote sites and integrates the received vectorized data indexes with a local vectorized data index of the main site such that the vectorized data index in the main site includes entries for all data stored across both the main site and the one or more remote sites; and the one or more remote sites, each comprising another storage system that manages second data according to second data regulation rules configured to restrict copying of the managed second data according to location restriction and user privilege;

wherein each of the one or more remote sites includes a data regulation table that specifies, for each data item, an accessible privilege field indicating required user privilege and an accessible location field indicating permitted copy locations; and wherein the AI augmented engine is configured to, in response to the query, copy the query related data from the one or more remote sites to the storage system of the main site, when permitted by the second data regulation rules of the one or more remote sites by comparing a user privilege associated with the query against the accessible privilege field and comparing a location of the main site against the accessible location field.

2. The system of claim 1, wherein the vector database at each of the one or more remote sites includes a vector index send function that periodically sends the vectorized data index to the index integrate function at the main site.

3. The system of claim 1, wherein each of the one or more remote sites includes a data output function that checks the second data regulation rules by referring to the data regulation table; and the data output function outputs the query related data to a data copy function only when the user privilege associated with the query matches the accessible privilege field and the location of the main site matches the accessible location field, and sends an error reason indicating privilege violation or location violation when the second data regulation rules are not satisfied.

4. The system of claim 1, wherein the AI augmented engine is configured to manage a query history that records queries received from users;

analyze a distribution of query vectors derived from the query history;

determine data to be cached based on proximity of document vectors to the query vectors; and copy the determined data into a cache memory of the main site based on analysis of the query history.

5. A method for improving the accuracy of artificial intelligence (AI) by providing an AI engine with related data in response to a query, comprising:

for a main site comprising a storage system:

managing, at one or more servers, an AI augmented engine configured to provide the AI engine with related data in response to the query, the AI engine configured to provide output in response to input queries and the related data; and managing first data according to first data regulation rules at the storage system; and managing a vector database that stores a vectorized data index comprising vectorized representations of data stored across the main site and one or more remote sites;

identifying query related data by vectorizing the query into a query vector and comparing the query vector with the vectorized representations in the vectorized data index using a vector similarity metric to identify data having conceptual similarity to the query based on vector proximity;

receiving vectorized data indexes from vector databases at each of the one or more remote sites and integrating the received vectorized data indexes with a local vectorized data index of the main site such that the vectorized data index in the main site includes entries for all data stored across both the main site and the one or more remote sites; and for the one or more remote sites, each comprising another storage system:

managing second data according to second data regulation rules configured to restrict copying of the managed second data according to location restriction and user privilege; and maintaining a data regulation table that specifies, for each data item, an accessible privilege field indicating required user privilege and an accessible location field indicating permitted copy locations; and in response to the query, copying the query related data from the one or more remote sites to the storage system of the main site, when permitted by the second data regulation rules of the one or more remote sites by comparing a user privilege associated with the query against the accessible privilege field and comparing a location of the main site against the accessible location field.

6. The method of claim 5, further comprising periodically sending the vectorized data indexes from the vector databases at each of the one or more remote sites to the main site for integration with the local vectorized data index.

7. The method of claim 5, further comprising at each of the one or more remote sites, checking the second data regulation rules by referring to the data regulation table;

outputting the query related data to a data copy function only when the user privilege associated with the query matches the accessible privilege field and the location of the main site matches the accessible location field; and sending an error reason indicating privilege violation or location violation when the second data regulation rules are not satisfied.

8. The method of claim 5, further comprising:

managing a query history that records queries received from users;

analyzing a distribution of query vectors derived from the query history;

determining data to be cached based on proximity of document vectors to the query vectors; and copying the determined data into a cache memory of the main site based on analysis of the query history.

\* \* \* \* \*